April 26, 1938.   J. I. HOKE   2,115,167
GRAIN SEEDER FEED DEVICE
Filed Jan. 28, 1937
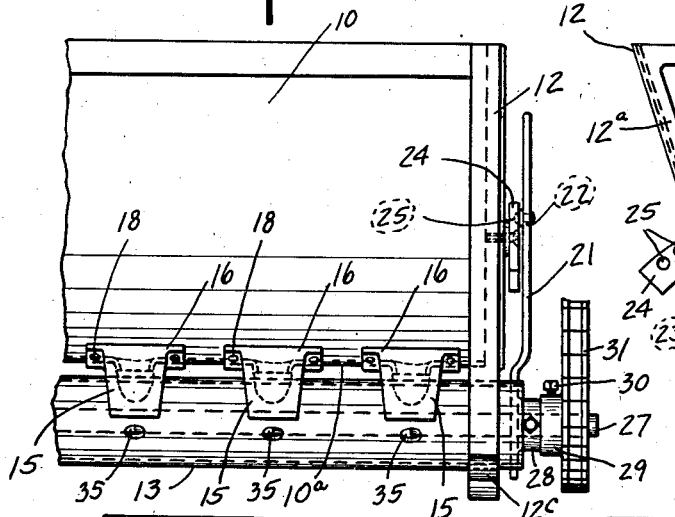
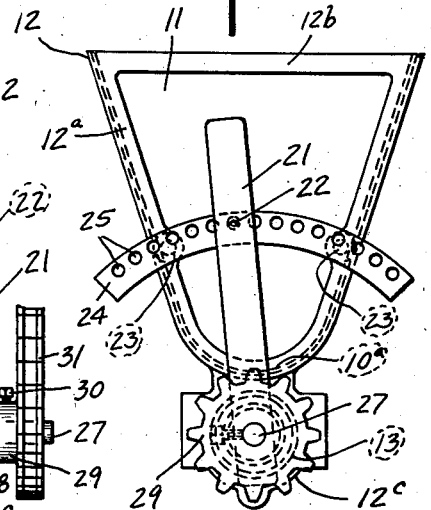
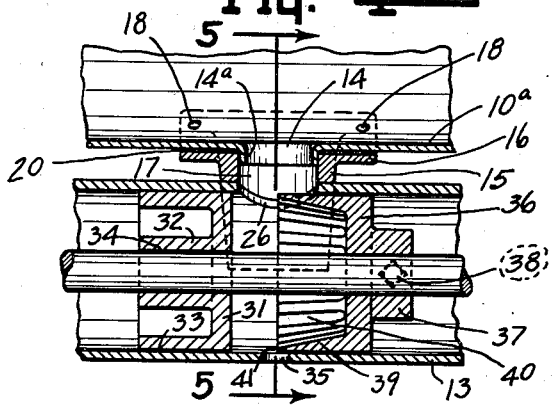
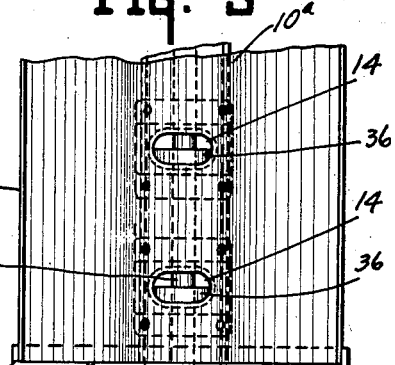
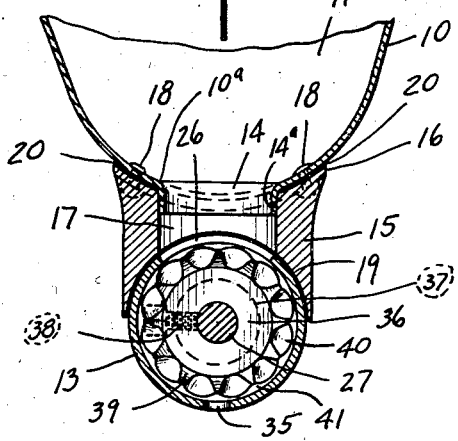
INVENTOR.
JOHN I. HOKE.
BY
Lockwood Goldsmith & Geof
ATTORNEYS.

Patented Apr. 26, 1938

2,115,167

UNITED STATES PATENT OFFICE 2,115,167

GRAIN SEEDER FEED DEVICE

John I. Hoke, New Carlisle, Ind.

Application January 28, 1937, Serial No. 122,707

11 Claims. (Cl. 221—136)

This invention relates to a grain seeder feed device.

The chief object of this invention is to provide a grain seeder feed device with a control discharge such that the rate of feed or discharge may be regulated and if, as and when desired, the control mechanism may be completely emptied of seed, thereby preventing fouling of the device and other objects of like character resulting therefrom.

The chief feature of the device consists in providing a rotative regulating sleeve in association with a positive discharge mechanism, both being associated with the discharge orifice or outlet of the grain seeder feed device.

Other features of the invention will be pointed out more fully hereinafter.

The full nature of the invention will be understood from the accompanying drawing and the following description and claims:

In the drawing Fig. 1 is a front elevational view of one end of the invention.

Fig. 2 is a side elevation thereof.

Fig. 3 is a top plan view of the same portion of the invention.

Fig. 4 is an enlarged longitudinal sectional view of the control mechanism.

Fig. 5 is a transverse sectional view taken on line 5—5 of Fig. 4 and in the direction of the arrows.

Grain seeder feed devices are well known agricultural implements, and the same are usually mounted on wheels and are drawn by a team or a tractor or may be connected to other agricultural devices and towed thereby. The grain seeder feed device disclosed herein is not only capable of such operation, but also may be mounted upon such devices as clod packers, and the like.

In most cases the seed feeding mechanism is operated by power derived through traction or tractive elements.

Since the present invention is not concerned with the method of mounting the device nor the source of power for operating same, there has been illustrated herein only that portion of the device to which the invention is specifically directed.

In the drawing there is illustrated but one end of such a device embodying the invention, it being understood that the opposite end may be similarly formed with the possible exception that the adjusting lever and associated locking mechanism is omitted.

In the drawing 10 indicates a side wall of a hopper and 11 an end wall. The side wall and end walls are reenforced by a frame end member 12 which has a substantially hopper like outline formed by the sides 12a, a top cross member 12b and a circular extension 12c. The circular extension 12c rotatably supports a tube 13. A suitable number of apertures 14 are provided in the bottom portion 10a. These apertures are defined by collar portions 14a formed from the metal 10a.

A throat structure includes a casting 15 having the arcuate flange portion 16 and a discharge passage 17 therein and into which the collar 14a projects. The flange 16 is suitably secured to the bottom 10a of the hopper portion 10 as by rivets 18, or the like. The throat 15 terminates in an arcuate conformation 19 which substantially conforms to the major portion of half of the periphery of the pipe 13, see Fig. 5. Interposed between the throat 15 and the hopper is a gasket 20 which may be of felt, or the like. This prevents moisture, dirt, and the like, from entering the passage 17 by draining down the outside wall of the hopper. The several openings 14 are longitudinally aligned and are in predetermined spaced relation. The corresponding throats are similarly arranged.

As previously stated, the tube 13 is rotatably supported in the circular extensions 12c of the two end frames. Any number of intermediate and complementarily formed frames may also be provided and thus intermediately support the tube.

Rigidly secured to the tube at one end and beyond the frame is a lever 21, said lever having a pin 22. The end frame adjacent the lever 21 detachably supports as at 23 an arcuate plate 24 having spaced recesses 25 therein, said recesses being aligned on the arc of a circle, the axis of which coincides with the axis of the tube. The resiliency of the lever is such that it is normally constrained to seat the pin 22 in one of the registering recesses 25 and thus be retained therein. The tube, therefore, is rotatably adjustable and locked in the desired rotative position.

The tube includes a plurality of inlet openings in similar spaced relation and longitudinally aligned. One of said openings is indicated clearly in Figs. 4 and 5 and is designated by the numeral 26 therein.

Coaxial with the tube is a shaft 27 and said shaft projects beyond the tube and if desired, projects beyond the same at each end. The free end of the shaft is rotatably supported in the hub portion 28 of the lever 21, said hub portion closing the end of the tube.

A sprocket 29 is suitably secured to the free and exposed end of the shaft 27 by the set screw 30, or the like. The sprocket is driven by a chain 31, the latter in turn being driven from the tractive element, such as a supporting wheel, of the device itself or may be driven from some other source of power on some other tractive implement, to which the device may be applied, as initially set forth herein. The sprocket and chain are merely conventional representations of a source of rotative power for the shaft.

The shaft supports adjacent each opening 26 and within the tube, a closure 31 which has a tubular bearing 32 and a cylindrical bearing 33. The latter conforms to the interior of the tube 13. The former has a bore 34 therein which conforms to the shaft. The closure 31 may be secured rigidly to the shaft, in which event it will rotate within the tube or it may be secured rigidly to the tube, in which event the shaft will rotate in the closure bearing 34. Either form of construction may be utilized, depending upon which is preferred.

The tube 13, diametrically opposite opening 26, is provided with a smaller and discharge opening 35. These openings are in diametrical alignment. Suitably secured on the shaft 27 is a closure 36, said closure 36 with the closure 31 forming a chamber, the intake of which is the opening 26 in the tube and the discharge of which is the opening 35 therein. The closure 36 has a hub portion 37 and a set screw 38, or the like, secures the hub to the shaft 27.

To facilitate the discharge and prevent clogging or packing, there is provided an agitator and herein the same is formed as a cylindrical extension 39 directed inwardly into the tube chamber. It is to be understood the cylindrical extension 39 is rotatably associated with the tube. The interior of the cup shaped arrangement, including portions 36 and 39, is scalloped as at 40, forming teeth or the equivalent, on the interior of said cup and this serves to agitate and move the seed in the tube chamber. As shown clearly in Figs. 4 and 5, the recessing or serrating 40 is directed outwardly from the axis toward the edge 41 of the cup construction. The edge 41 of the cup construction is substantially coplanar with the diametrical axis of the openings 26—35.

In this way to a limited extent, this cup construction serves as a restraint device. The cup construction may be set or adjusted longitudinally on the axis to any other position so it will regulate the flow of seed from the hopper to the tube chamber and from the tube chamber exteriorly of the device. In other words, when larger seed is being used in the device the closures 36 may be moved axially to the right—see Fig. 4— and secured in the desired adjusted position. When smaller seed is being used in the device, the adjustment is in the opposite direction. The aforesaid adjustment permits the device to handle various sizes of seed and, therefore, different kinds of seed. To regulate the feed of the particular type of seed used in the device, the lever 21 is moved to the desired arcuate position and yieldingly locked therein by the pin 22 seating in the adjacent recess 25. This rotative adjusted position of the tube determines the degree of registration of the passage 17 and the opening 26, these two being of substantially equal area. Also, the arcuate shifting of the tube simultaneously shifts in a similar direction the discharge 35.

The foregoing arrangement permits the tube to be so adjusted that it will completely cut off communication between the passage 17 and the tubular chamber and will permit at the same time discharge through opening 35 of the seed in the tubular chamber. This permits complete cleaning of the machine except for the seed contained in the hopper. Thus, the device can be left in the field with the feeding mechanism in the cut-off position.

It is to be understood the device includes a cover, now shown, so that the seed in the hopper would be protected against the entrance of dirt and moisture.

Whenever it is desired to completely remove the seed from the device, the rotative power may be actuated with the device held stationary and all of the seed completely discharged or if desired, all the seed in the hopper can be readily removed therefrom through the upper end of the hopper, except that which is entrapped in the passage 17 and this may be readily removed by rotating the control mechanism shown more especially in Fig. 4.

With this invention, it is apparent that the device is adapted to handle different sizes of seed and is adapted to discharge regulated amounts thereof so that the device is substantially universal in its application and has the further advantage that it may be readily cleaned, emptied or if seed is retained therein temporarily, the seed is protected against damage as aforesaid.

While the invention has been described in great detail in the foregoing description, the same together with the illustration of the invention is to be considered as illustrative and not restrictive in character. Various modifications of the invention such as herein described, as well as others which will readily suggest themselves to persons skilled in this art, are all considered to be within the broad scope of the invention, reference being had to the appended claims.

The invention claimed is:—

1. In a grain seed feeding device, the combination of an elongated hopper including a plurality of spaced apertures in the bottom thereof, a tube therebeneath and correspondingly apertured, means operatively connecting the hopper to the tube and forming individual passages from the apertures in the hopper to the adjacent tube apertures, said tube including a similar number of correspondingly spaced discharge apertures, means in the tube forming tube chambers in free communication with each pair of intake and discharge apertures, and rotatable means in each tube chamber for insuring non-clogging passage of seed through the chamber.

2. In a grain seed feeding device, the combination of a hopper including a discharge throat having a lower face of partial cylindrical form, an apertured tube supported in juxtaposition to the throat lower face, the tube apertures providing an upper intake and a lower discharge to and from an intermediate tube chamber, means substantially sealing the tube at opposite sides of the apertures to form the tube chamber, a toothed member rotatable in the tube chamber substantially as and for the purpose described, the tube being pivotally mounted, means for retaining the tube in adjusted pivotal position for regulating the amount of registration between the throat and the intake for regulating the flow of seed through the chamber.

3. In a grain seed feeding device, the combination of a hopper including a discharge throat having a lower face of partial cylindrical form, an apertured tube supported in juxtaposition to the throat lower face, the tube apertures providing an upper intake and a lower discharge to and from an intermediate tube chamber, means substantially sealing the tube at opposite sides of the apertures to form the tube chamber, the tube being pivotally mounted, means for retaining the tube in adjusted pivotal position for regulating the amount of registration between the throat and the intake for regulating the flow of seed through the chamber, rotatable means in each tube chamber for insuring non-clogging passage of seed through the chamber, and means axially adjusting the tube sealing means relative to the tube for the purpose described.

4. In a grain seed feeding device, the combination of a hopper, an end frame associated therewith and including a depending extension with a cylindrical bore therein, a tube rotatably supported in said bore and projecting beyond the same, throat means interposed between the tube and hopper and providing individual throat passages between the hopper and the tube, means in the tube forming tube chambers, one for each throat passage, each chamber having an intake communicating with the throat passage and a discharge, and means for rotating and securing in rotated position the tube for regulating the seed feeding.

5. In a grain seed feeding device, the combination of a hopper, an end frame associated therewith and including a depending extension with a cylindrical bore therein, a tube rotatably supported in said bore and projecting beyond the same, throat means interposed between the tube and hopper and providing individual throat passages between the hopper and the tube, means in the tube forming tube chambers, one for each throat passage, each chamber having an intake communicating with the throat passage and a discharge, means for rotating and securing in rotated position the tube for regulating the seed feeding, a coaxial shaft within said tube and projecting beyond the same, means on the exposed end of said shaft for rotating the same, and means in each tube chamber rotatable by said shaft for insuring the free flow of seed through the chamber.

6. A device as defined by claim 4, characterized by certain of the tube chamber forming means being axially movable for seed size adjustment.

7. A device as defined by claim 5, characterized by certain of the tube chamber forming means being axially movable for seed size adjustment.

8. In a grain seed feeding device, the combination of an apertured hopper, a throat associated therewith having a passage registering with the apertures and the arcuate face remote from the hopper, a tube rotatably mounted adjacent the hopper and exteriorly contacting the arcuate face and including an intake aperture adapted for throat passage registration and a discharge aperture, means rotatably supporting the tube, other means for rotating the tube and securing the same in adjusted rotated position for regulating the amount of registration between the intake aperture of the tube and the throat passage, a coaxial shaft within the tube, means for rotating the shaft, a closure within the tube and concentric with the shaft and at one side of the apertures forming one wall of a tube chamber, a closure rigid with the shaft and rotatable within the tube and axially adjustable relative thereto for regulating the effective area of the tube chamber intake aperture.

9. A device as defined by claim 8, characterized by the last mentioned closure being of cup formation, the interior side wall surface being toothed to insure non-clogging passage of the seed through the tube chamber.

10. A device as defined by claim 8, characterized by the last mentioned closure being of cup formation, the interior side wall surface being toothed to insure non-clogging passage of the seed through the tube chamber, seal means between the throat and the hopper, and collar means nestable in the throat and defining the hopper aperture.

11. A device as defined by claim 3, characterized by the rotatable means constituting an extension of a portion of the tube sealing means.

JOHN I. HOKE.